United States Patent Office 2,920,079
Patented Jan. 5, 1960

---

2,920,079

PIPERIDINOLACTAMIDE

Robert L. Hudson, Midland, Mich., assignor to The Dow Chemical Company, Midland, Mich., a corporation of Delaware No Drawing. Application October 29, 1958
Serial No. 770,320

2 Claims. (Cl. 260—294)

The present invention is directed to the novel compound, 3-(o-chlorophenyl)-2-methyl-3-piperidinolactamide, and to a method for preparing the same. The novel compound corresponds to the formula

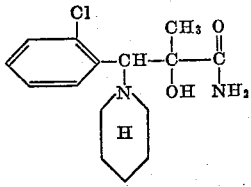

The compound is a crystalline solid which in mass appears white, is soluble in many common organic solvents such as diethyl ether, acetone, and 1,1,1-trichloroethane, and is of low solubility in water. It is useful as a parasiticide for the control of insects, pathogenic fungi, and as a herbicide.

The present compound may be prepared by contacting together 3-(o-chlorophenyl)-2-methylglycidamide corresponding to the formula

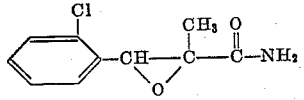

and piperidine. Conveniently, the reaction is carried out by preparing a liquid reaction mixture, which may be a mixture of 3-(o-chlorophenyl)-2-methylglycidamide with piperidine, and subjecting the said mixture to reaction temperatures, whereupon the present compound may be separated therefrom. Good results are obtained when employing piperidine in an amount substantially in excess of that equimolecular with the glycidamide reactant. An inert liquid reaction medium may be employed, if desired. The process is somewhat endothermic, and takes place smoothly at temperatures of from approximately 50° C. to approximately 100° C., with production of the compound of the present invention and water of reaction.

In carrying out the reaction, the 3-(o-chlorophenyl) 2-methylglycidamide, piperidine and, if employed, inert solvent, are intimately mixed and blended together. The combining of the reactants may be carried out at room temperature. The resulting reaction mixture is thereafter heated for a period of time, conveniently at the reflux temperature, to carry the reaction to completion. Upon completion of the reaction, the desired product may be separated in known manners. In one such separation, the reaction mixture is diluted with water, and filtered, to obtain a crude product as residue. This product may be recrystallized from a petroleum ether-1,1,1-trichloroethane mixture, and thereby purified.

The following example illustrates the invention but is not to be considered as limiting it.

*Example 1*

A mixture of 4 grams 3-(o-chlorophenyl)-2-methylglycidamide, 40 grams piperidine and 10 milliliters ethanol was heated at the boiling temperature (about 80° C.), with stirring and under reflux for 16 hours, and thereafter allowed to cool to room temperature. A large excess of water was added to the cooled mixture, whereupon a product precipitated therein, and was separated by filtration. The product residue thus separated was recrystallized from a petroleum ether-1,1,1-trichloroethane mixture to obtain a 3-(o-chlorophenyl)-2-methyl-3-piperidinolactamide product as a crystalline solid melting at 156°–157° C.

The compound of the present invention is useful as a fungicide, as a selective herbicide, and as an insecticide. For such use, the unmodified compound may be used. Alternatively, the compound may be dispersed on an inert finely divided solid and the resulting preparation employed as a dust. Also, such preparations may be dispersed in water with or without the aid of a wetting agent and the resulting aqueous suspensions employed as sprays. In other procedures, the compound may be employed in oil or other solvent or as a constituent of solvent-in-water or water-in-solvent emulsions or as aqueous dispersions thereof which may be applied as spray, drench, or wash. In a representative operation, application to a population of young bean plants of an aqueous dispersion containing the present compound as sole toxicant in the concentration of eight ounces per hundred gallons of ultimate composition gave the said bean plants 99 percent protection from bean anthracnose, a suspension of the viable spores of which was sprayed upon the said plants after the application of the present compound: no chemical injury to the bean plants was noted. In contrast, a similar group of bean plants treated identically except that the present compound was omitted was heavily infested and severely injured by the fungus.

The compound 3-(o-chlorophenyl)-2-methylglycidamide employed as a reactant in preparing the compound of the present invention may be prepared by contacting together methyl 3-(o-chlorophenyl)-2-methylglycidate and ammonium hydroxide, conveniently in ethanol as reaction medium, in the manner fully set forth in my copending application Serial Number 770,319 filed even date herewith.

Various modifications of the process and products of the present invention may be made without departing from the spirit or scope thereof, and it is to be understood that I limit myself only as defined in the appended claims.

I claim:

1. 3 - (o-chlorophenyl)-2-methyl-3-piperidinolactamide corresponding to the formula

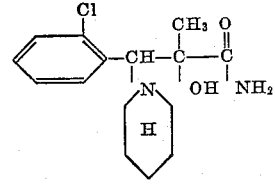

2. A method of preparing 3-(o-chlorophenyl)-2-methyl-3-piperidinolactamide which comprises the steps of subjecting a liquid mixture of 3-(o-chlorophenyl)-2-methlglycidamide and piperidine to a reaction temperature and thereafter separating 3-(o-chlorophenyl)-2-methyl-3-piperidinolactamide.

No references cited.